United States Patent

[11] 3,605,064

[72] Inventors Larry L. Routh
Castro Valley;
James Contratto, Livermore, both of, Calif.
[21] Appl. No. 780,840
[22] Filed Dec. 3, 1968
[45] Patented Sept. 14, 1971
[73] Assignee U.S. Industries, Inc.
New York, N.Y.

[54] SPLICE BOX FOR A POWER DISTRIBUTION SYSTEM
11 Claims, 7 Drawing Figs.

[52] U.S. Cl. .................................................. 339/21 R,
200/51 R, 339/20 R, 339/22 B
[51] Int. Cl. ..................................................... H01r 9/02,
H01r 13/46, H01r 19/54
[50] Field of Search ............................................ 339/20, 21,
22; 200/51, 51.01, 51.02, 51.03, 51.07

[56] References Cited
UNITED STATES PATENTS
| | | | |
|---|---|---|---|
| 2,636,950 | 4/1953 | Boadway ..................... | 339/20 X |
| 2,924,803 | 2/1960 | Platz ............................ | 339/21 |
| 3,094,584 | 6/1963 | Liberman et al ............ | 339/22 X |
| 3,295,093 | 12/1966 | Neumann et al ........... | 339/21 |
| 3,299,391 | 1/1967 | Herrmann et al .......... | 339/21 X |

*Primary Examiner*—Ernest R. Purser
*Assistant Examiner*—Terrell P. Lewis
*Attorney*—Gardner & Zimmerman ABSTRACT: A splice box or coupler for a power distribution system of the type providing a substantially continuous convenience outlet enabling electrical plugs to be connected thereto at substantially any selected location therealong. The system includes one or more track components that provide such convenience outlet, and each such track component is equipped with a conductor assembly having a plurality of spaced-apart conductors. The splice box or coupler is connectable with such track component at an end thereof, and may be used either to join successive track components or to attach an end block or junction box thereto at which the conductors of the distribution system are connected with power supply lines. The splice box, for the purpose of establishing connection thereof with a track component, has a housing portion insertable into the end of a track component, and it is equipped with a plurality of contacts movable into engagement with the respective conductors of such track component when assembled therewith, and which contacts are selectively manipulatable to establish either a two-conductor single electric circuit or a three-conductor double electric circuit.

3,605,064

INVENTOR.
LARRY L. ROUTH
JAMES CONTRATTO
BY Gardner & Zimmerman
Attorneys

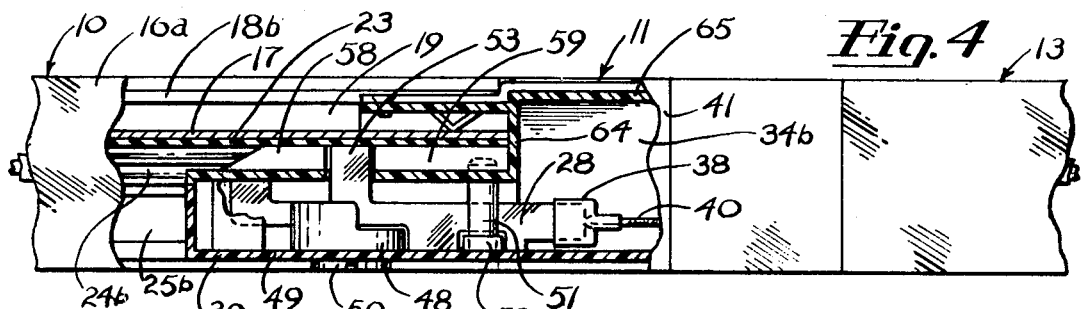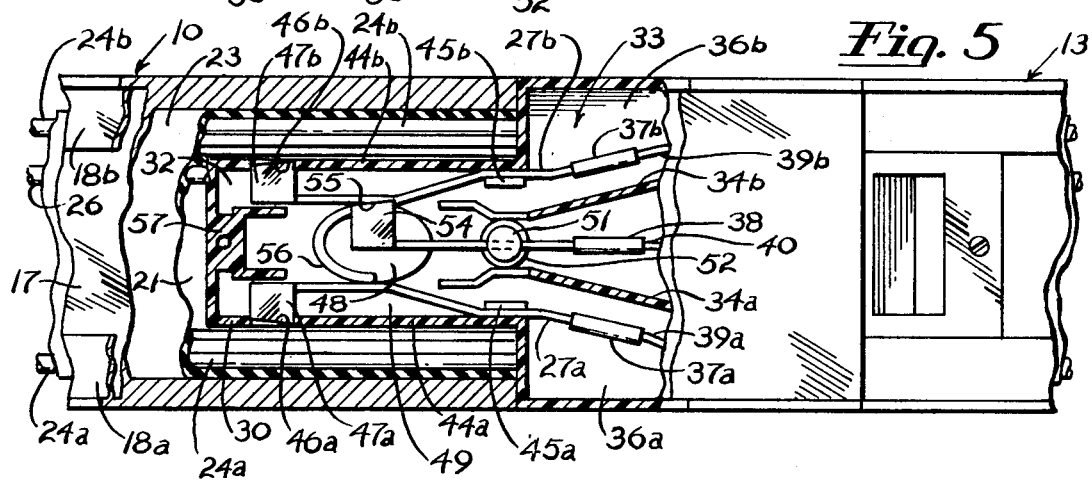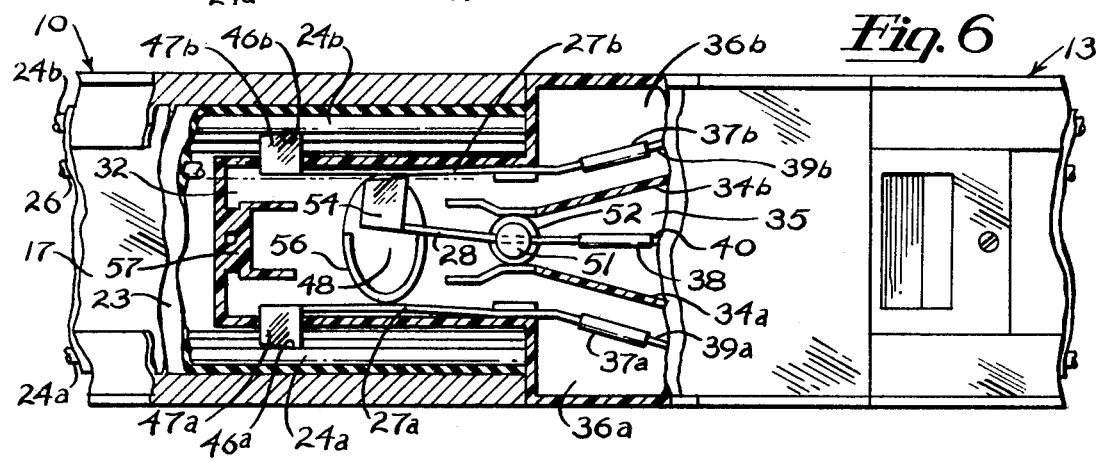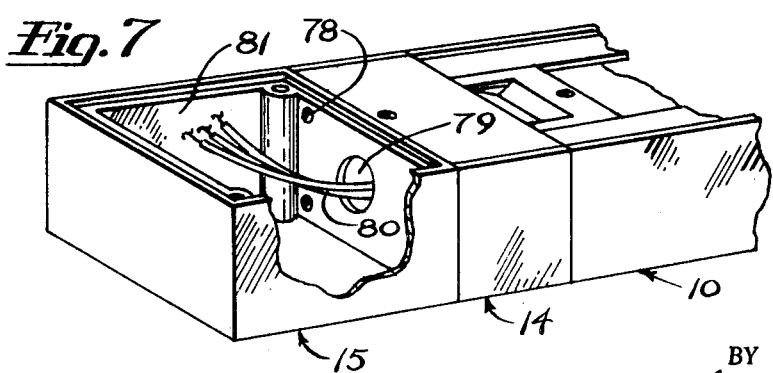

SPLICE BOX FOR A POWER DISTRIBUTION SYSTEM

This invention relates to a power distribution system and, more particularly, to a splice box or coupler for a power distribution system having elongated rack components provided with substantially continuous receptacles or convenience outlets therealong adapted to have plugs connected thereto at substantially any selected location along the length thereof.

As explained in the copending patent application of Larry L. Routh entitled "Power Distribution System," Ser. No. 695,655, filed Jan. 4, 1968, the location of convenience outlets, junction boxes, and other fixed points of connection within an electric power distribution system is most often a compromise with the various locations being selected on the basis of custom or in anticipation of the use expected for the building space containing the distribution system. This is particularly unsatisfactory especially in commercial and industrial buildings since the use of any particular space therein is not necessarily static, and any change in use may require relocation of the various outlets and other points of connection. In this respect, the divider walls or partitions in such buildings may be changed bodily, and modern buildings are designed so as to afford ready change of such dividing walls from one location to another so as to provide considerable versatility in the use of the building space. In view of this, power distribution systems have been proposed heretofore which are intended to afford a degree of flexibility as respects the location at which lights and other electrically operated devices may be connected thereto, and one such system is disclosed in the aforesaid U.S. Pat. application, Ser. No. 695,655.

A difficulty with existing power systems of this type is that interconnection of the receptacle-equipped track components thereof is effected by splice boxes requiring special connector arrangements at the ends of the track components, and as a consequence, it is very difficult to interconnect successive track components unless they are of standard lengths equipped with such special arrangements at the ends thereof at the time of their manufacture. Clearly, this requirement imposes limitations on the use of these systems since in those instances in which standard lengths can not be employed, it has usually been necessary to have special or custom lengths made to order. In view of this, a general object of the present invention is to provide an improved power distribution system of the type affording substantially infinite selection of the locations along the lengths thereof at which lights and other electrically operated devices can be connected thereto, and which improved system has track components and splice boxes enabling quick and easy interconnection therebetween without the requirement for special connection arrangements at the ends of the track components, thereby enabling the same to be cut at the site of their installation to any requisite lengths.

More particular objects, among others, are to provide an improved power distribution system of the character described in which each track component can be used in either a two-conductor single electric circuit or three-conductor double electric circuit without change, and in which each splice box or coupler is similarly equipped for use in either such circuit and is connectable quickly and easily with such track component so as to condition the same selectively for the desired two-conductor or three-conductor circuit; and to provide a splice box having a housing equipped with a forwardly extending section adapted to be inserted into a chamber provided along the receptacle-equipped track component, and which splice box is further provided with guide structure cooperative with such track component to establish a predetermined positional relationship therebetween, the splice box having a plurality of contacts normally disposed in an inner retracted position during such insertion of the housing secton into the track components and selectively displaceable outwardly through the manipulation of selector structure to establish connection of the contacts with the conductors of the track component either in a two-conductor or three-conductor circuit configuration. Additional objects and advantages of the invention, especially as concerns particular features and characteristics thereof, will become apparent as the specification develops.

A power distribution system embodying the present invention may include a plurality of elongated, longitudinally extending track components connected one with another in a succession thereof, and such track components may include a splice box and a receptacle-equipped track component defining a longitudinally extending convenience outlet therealong. Each of the track components is relatively rigid and is intended to be supported along a ceiling or other building wall and, in many cases, is either partially or completely embedded therein. Each receptacle-equipped track component is adapted to have male plugs connected at any suitable location along the conveience outlet thereof, and cooperative polarization means may be provided by the track component and by such plug to permit connection thereof in only one relative orientation. Each splice box is connectable with a track component at an end thereof, and in interconnecting two successive track components a pair of reversely oriented splice boxes may be used in respective association with such components; and such splice box may also be used at an end of a track component to connect the conductors thereof with a junction or end box within which connection is made to other conductors such as power supply lines.

An embodiment of the invention is illustrated in the accompanying drawings, in which:

FIG. 4 is a broken side view in elevation of the components shown in FIG. 1 but in their interconnected state, one of the splice boxes thereof being for the most part shown in longitudinal section;

FIG. 5 is a broken top plan view of the interconnected components shown in FIG. 4 with portions of the same splice box being illustrated in cross section and in a neutral condition in which the contacts thereof are not connected with the conductors of the associated receptacle-equipped track component;

FIG. 6 is a top plan view similar to that of FIG. 5 but showing the splice box conditioned for a three-conductor double electric circuit; and FIG. 7 is a broken perspective view showing the splice box in association with an end box or connector block of such power distribution system.

Figure 1:
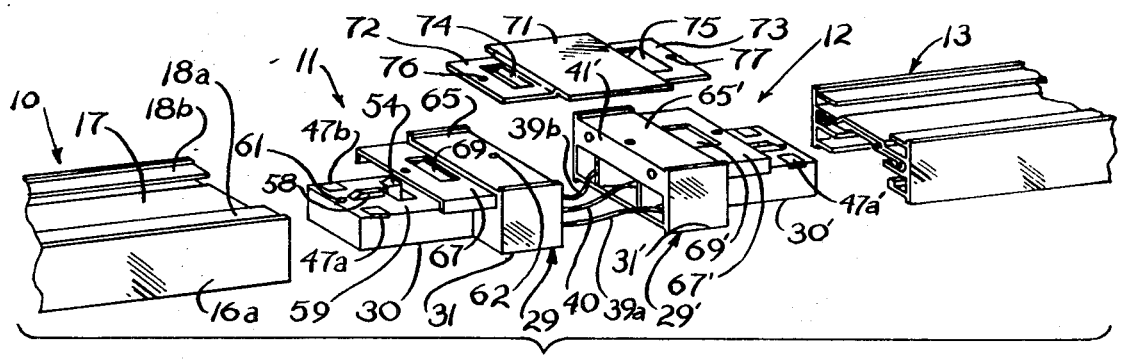
FIG. 1 is a broken perspective view illustrating in spaced-apart relation certain components of a power distribution system embodying the present invention.

The power distribution system illustrated in FIG. 1 can be used selectively as a two-conductor single electric circuit of a three-conductor double electric circuit, and it includes a plurality of interconnected track components respectively denoted with the numerals 10, 11, 12 and 13. The track components 10 and 13 are substantially identical in construction and function, and they are each receptacle-equipped components adapted to have one or more plugs (not shown) connected therewith at various locations therealong. The track components 11 and 12 are each splice boxes and as shown each is used as a coupler or joiner box by means of which a plurality of receptacle-equipped track components 10 and 13 of any convenient or necessary length may be connected one with another.

In the usual case a splice box is also provided at least at one end of a run of track components so that the conductors thereof can be connected conveniently to power supply lines. FIG. 7 illustrates such an arrangement adjacent the outer end of the track components 10 which is equipped thereat with a splice box 14 having an end or connector box 15 arranged therewith and within which the conductors of the power distribution system are connected with the power supply lines.

The track components 10 and 13 may be substantially the same as those disclosed in the aforementioned copending patent application of Larry L. Routh, Ser. No. 695,655, filed Jan. 4, 1968, and are adapted for use with a male plug or adapter of the type shown and described in such application and which adapter can be releasably secured to the track components at selected locations therealong. Such plugs or adapters and the receptacle-equipped track components are polarized so as to cause each plug to have a predetermined orientation with respect to an associated track component, thereby causing particular polarities are observed in interconnecting the same. Apart from such polarization means, the receptacle-equipped track components are generally symmetrical about a vertical centerline therethrough, and in view of such general symmetry the same numerals are employed to identify the oppositely positioned counterpart elements except that the suffixes a and b are added for purposes of differentiation therebetween.

Figure 3:
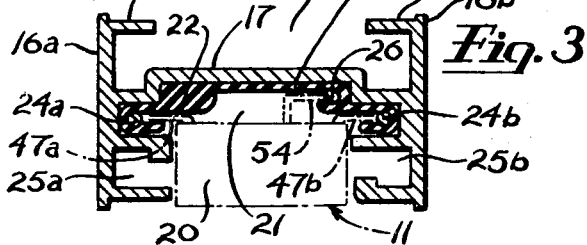
FIG. 3 is a transverse sectional view, taken along the line 3—3 of FIG. 1, of a receptacle-equipped track component forming a part of the power distribution system.

Accordingly, and referring to FIG. 3 in particular, the track component 10 is seen to have a pair of longitudinally extending and transversely spaced sidewalls 16a and 16b formed integrally with a longitudinally extending web 17 that is transversely disposed and projects between the sidewalls intermediate the top and bottom thereof. Adjacent their upper ends, the sidewalls 16 are turned inwardly to define flanges 18a and 18b that in certain environments may receive a cover (not shown) thereon which together with the web 17 and spaced sidewalls 16 define a longitudinally extending chamber or wireway 19 in which insulated wires or other conductors may be carried from one location to another, should this be desired.

Exteriorly the sidewalls 16 may be provided with polarization means (not shown) to enforce a predetermined orientation onto a succession of track components interconnected one with another, as explained in the aforementioned copending patent application. The sidewalls 16 also may be provided with outwardly extending flanges (not shown) useful in completely or partially recessing the track components in a ceiling or other building wall—which flanges and their use are also disclosed in such copending patent application. As respects the present invention, neither such polarization features nor mounting arrangement are pertinent and, therefore, necessitate no further discussion.

The track component 10 is provided with a chamber or receptacle 20 in underlying relation with the web 17, and such receptacle defines a longitudinally extending convenience outlet adapted to receive one or more of the aforementioned plugs or adapters. The elongated receptacle 20 adjacent its upper end is provided with a longitudinally extending compartment 21 having a conductor assembly 22 mounted therein. The conductor assembly 22 includes an elongated insulator or insulated holder 23 turned inwardly upon itself along the longitudinal edges thereof to form longitudinally extending slots in which are mounted conductors 24a and 24b. The slots confine the conductors 24 therewithin and are provided with restricted mouths adapted to pass therethrough the contacts of such a plug or adapter. The insulator 23 is sufficiently rigid to be substantially self-sustaining so as to maintain the conductors 24 in the spaced-apart relation shown and to confine the same within the slots therefor. The conductors 24 may be conventional copper wires (12 gauge, for example), and they may be constrained against longitudinal displacements with respect to the insulator 23 by collars (not shown) crimped about the conductors, all as explained in the aforementioned pending patent application.

The receptacle 20 defining the longitudinally extending convenience outlet is provided with polarizing means as mentioned hereinbefore, which includes a pair of transversely spaced and longitudinally extending recesses 25a and 25b respectively disposed along the sidewalls 16a and 16b adjacent the bottoms thereof. The recesses 25 are offset with respect to each other from top to bottom of the track component (as shown in FIG. 3) to effect such polarization and, accordingly, the correspondingly polarized members of such plug or adapter are alignable respectively only with the recess 25a or with the recess 25b as the case may be. A third conductor 26 is carried by the insulator 23 for use when it is desired to provide a three-conductor double electric circuit, and it will be observed that although the conductors 24 are disposed at substantially the same elevation in aligned parallelism, the adapter 26 is offset upwardly therefrom and is at a slightly higher elevation than the conductor 24 and lies inwardly thereof.

As suggested heretofore, for the purpose of enabling the receptacle-equipped track components to be readily accommodated by rooms and installations irrespective of the dimensional restrictions thereof, it is practicably necessary for such track components to be cut to length at the site of their installation, thereby requiring splice boxes nd connector arrangements having no special structural characteristics associated with the track components which might be lost upon cutting the same to custom or special lengths. The splice boxes 11, 12 and 14 are so connectable with the receptacle-equipped track components 10 and 13 irrespective of their being cut to any particular lengths; and it may be noted that the splice boxes 11, 12 and 14 are identical so that only the details of the box 11 will be set forth—the primed form of the same numerals used to identify the elements of the splice box 11 being used where appropriate to identify the respectively corresponding elements of the splice box 12.

The splice box or coupler 11 is not intended to have plugs, adapters or other utilization devices connected therewith and, accordingly, does not have an elongated receptacle for this purpose provided along the underside thereof. Generally, the splice box is intended to establish connection therethrough between successive track components or with connector blocks or end boxes, and, therefore, includes a plurality of contacts to establish connection with respective conductors of the track component 10. In positive terms, the splice box 11 is provided with a pair of contacts 27a and 27b that respectively engage the conductors 24a and 24b of the track component 10, and with a third or additional contact 28 which is selectively engageable with the conductor 26 of such track component and is used only when a three-conductor, double electric circuit is intended.

The contacts 27 and 28 are mounted within a housing or casing 29 having a forwardly extending section 30 insertable into the chamber 20 of the track component 10 (as shown in FIGS. 4, 5 and 6). The housing 29 is also provided with a rear end portion 31 enlarged both transversely and vertically with respect to the section 30, and it is abuttable with the end of the track component 10 upon such insertion of the housing section 30 thereinto, also, as shown in FIGS. 4 through 6. The housing is provided therein with a contact compartment 32 and with a connector compartment generally denoted 33 and which is subdivided by walls 34a and 34b into a central compartment section 35 defined between the walls 34a and 34b and outer compartments sections 36a and 36b respectively bordering the divider walls 34a and 34b (as shown best in FIGS. 5 and 6).

The contacts 27a and 27b are respectively associated with the outer compartment sections 36a and 36b and the additional contact 28 with the compartment section 35; and the divider walls 34a and 34b physically and electrically separate the contacts 27 and 28 from each other within the connector compartment 33. Within such compartment the contacts are connected by suitable terminals 37a, 37b and 38, respectively, to lead wires 39a, 39b and 40; and as is most evident in FIGS. 1, 2 and 4, the entire connector compartment 33 is open at the rear end thereof to provide access for connection of the lead wires 39 and 40 with the respective contacts 27 and 28 except along the upper end of the compartment at which a downwardly extending rear wall section 41 is provided. The wall section 41 is equipped centrally with a boss 42 having a threaded opening 43 therein which is used to connect a cover to the housing, as will be described hereinafter.

Figure 2:
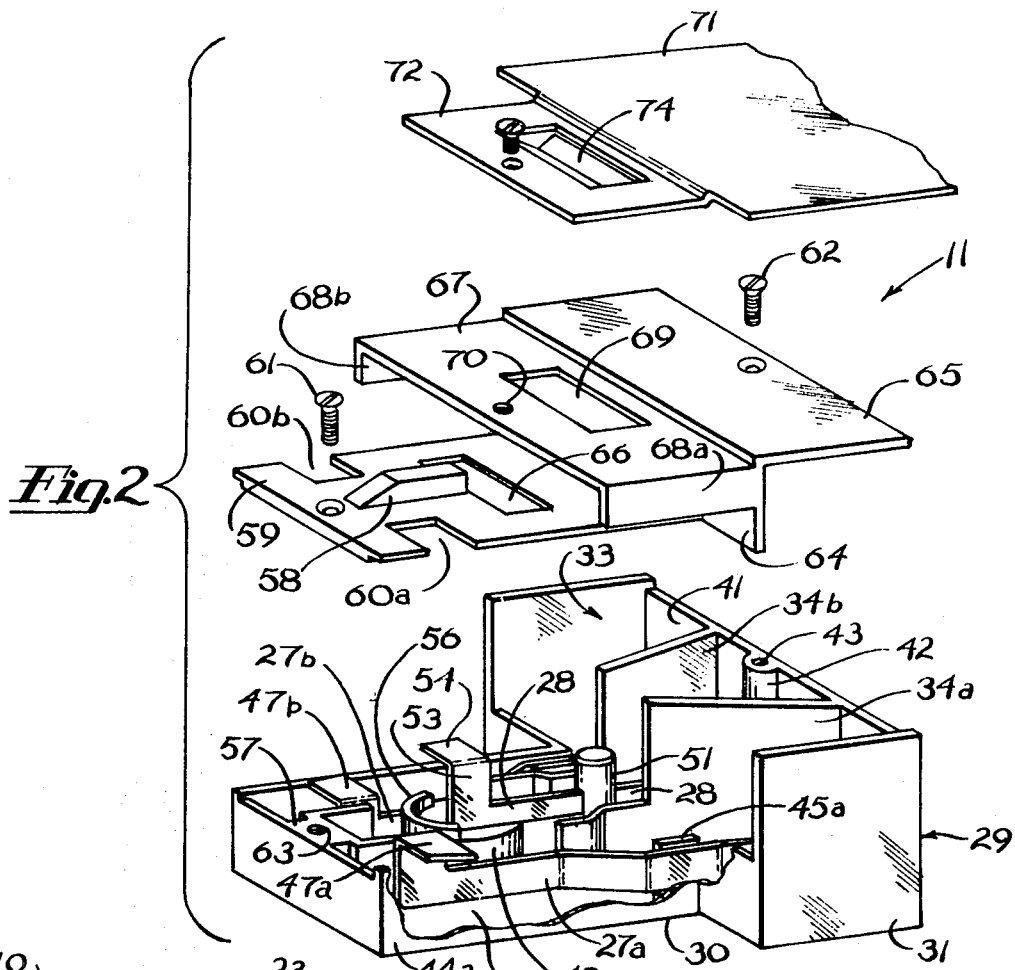
FIG. 2 is an enlarged, perspective view illustrating in spaced-apart relation the various elements of a splice box forming one of the components of such power distribution system.

Each of the contacts is elongated longitudinally with the contacts 27a and 27b being of the same length and disposed in transversely spaced, substantially parallel alignment, as is most evident perhaps in FIGS. 2 and 3. Each of the contacts 27 extends forwardly from the connector compartment 33 and seats within a channel provided therefor that is defined between the housing sidewall 44a and an upwardly extending boss 45a adjacent thereto in the case of the contact 27a and between the housing wall 44b and adjacent post 45b in the case of the contact 27b. The recesses respectively defined between the sidewalls 44 and posts 45 confine the contacts 27 therein, and it may be observed that the contacts are bent laterally adjacent the posts 45 and converge inwardly therefrom for a portion of their length to space the forward end portions of the contacts from the housing walls 44, as shown in FIG. 5, when the splice box is not in use. At the time of such nonuse, the inclined edges 46a and 46b of the outwardly turned terminal ends 47a and 47b of the contacts lie essentially within the transverse dimensions of the walls 44a and 44b. Thus, during insertion of the splice box 11 into the chamber 20 of the track component 10, the contacts 27 do not resist or otherwise inhibit such insertion.

Following such insertion, however, the contacts 27 are displaced outwardly to cause such inclined edges 46 thereof to mechanically and electrically engage the conductors 24 of the track component 10, and such outward displacements of the forward end portions of the contacts 27 are effected by selector structure comprising an oblong or generally elliptical cam 48 supported by the housing section 30 along the bottom wall 49 thereof for angular displacements between the neutral position shown in FIG. 5 in which the greater axis of the ellipse is disposed in a longitudinal direction and an active position displaced therefrom by 90° in which such greater axis of the ellipse is transversely oriented, as shown in FIG. 6. It should be noted that as concerns the two contacts 27, the cam 48 may be angularly displaced in either direction (i.e., clockwise or counterclockwise) from the position illustrated in FIG. 5 for the purpose of displacing the contacts 27 outwardly to engage the terminal ends 47 thereof with the conductors 24.

In this respect, the forward end portions of the contacts 27 extend along and in proximity with the bottom wall 49 of the housing section 30, and such contacts are engaged by the cam 49 along the bottom thereof, wherefore the contacts 27 may be displaced independently of the contact 28, as will be explained subsequently. It may also be observed that the cam 48 has an end portion 50 extending downwardly through the bottom wall 49 of the housing section 30, and is provided with a slot for receipt of a screwdriver by means of which the cam is rotated.

The third contact 28 is centrally disposed and lies intermediate the paired contacts 27 and is somewhat shorter than such contacts in the longitudinal direction. The contact 28 projects forwardly from the connector compartment 33 through a slotted post 51 extending upwardly from the bottom wall 49 of the casing section 30 and supported intermediate the walls 44 thereof in a hollow collar 52 positioned along the bottom wall 49 and formed integrally therewith. As its forward end, the contact 28 projects upwardly (as shown at 53 in FIG. 2 and 4) and is turned laterally outwardly thereat to provide a terminal end portion 54 having an inclined outer edge 55 engageable with the conductor 26 of the track component 10 whenever the contact 28 is displaced outwardly from the inner neutral position shown in FIG. 5 into the active outer position illustrated in FIG. 6.

Ordinarily, the contact 28 has the position shown in FIG. 6 in which it extends generally along the longitudinal axis of the splice box 11, and it is adapted to be engaged by an upwardly extending lip 56 of the cam 48 upon displacement thereof through an angular distance approximating 90° from the neutral position shown in FIG. 5. Whenever the cam 48 is angularly displaced in a counterclockwise direction, as viewed in FIG. 5, into the position shown in FIG. 6, the upwardly extending lip 56 of the cam engages the contact 28 to displace it laterally, thereby causing the inclined edge 55 of the terminal end 54 thereof to be pushed into engagement with the conductor 26. At the same time, as explained heretofore, the contacts 27 will be displaced into engagement with the conductors 24, whereupon a three-conductor double electric circuit will be established—assuming that all three conductors of the track 10 are suitably connected to supply lines.

However, if the cam 48 is displaced angularly in the opposite direction (or clockwise as viewed in FIG. 5) through a distance of 90°, the contacts 27 will be displaced outwardly and into engagement with the conductors 24 but the contact 28 will be displaced away from the conductor 26 (i.e., as viewed in FIG. 5), whereupon the terminal end 54 thereof will become even more remote from the conductor 26 of the track component 10, in which case a two-conductor single electric circuit will be established. Although in the ordinary instance the contacts 27 and 28 remain in the active, extended position thereof when once displaced thereinto by the selector structure comprising the cam 48, the contacts have sufficient resilience to be self-biased toward their retracted inner positions, and may be made of a material such as relatively hard brass which has such inherent resilience.

The contacts 27 are isolated from each other adjacent the forward ends thereof by a generally U-shaped insulator 57 formed integrally with the housing 29 and located within the contact compartment 32 thereof. The contacts 27 are further isolated adjacent the outwardly turned terminal ends 47 thereof by a rib 58 (FIG. 2 in particular) that extends upwardly from a cover 59 along the center thereof, and which cover is provided along each side of the rib 58 with recesses 60a and 60b through which the end portions 47a and 47b of the respective contacts 27a and 27b extend. The cover 59 is adapted to seat upon the housing section 30 to close the compartment 32 thereof, and it is secured in position by suitable fasteners such as capscrews 61 and 62—the first of which is threadedly receivable within an opening 63 provided therefor in the insulator 57, and the second of which is receivable within the aforementioned threaded opening 43 in the boss 42 located adjacent the rear end of the housing. Evidently then, the cover 59 has a stepped portion including a generally vertical wall 64 and a horizontal extension 65 projecting rearwardly therefrom which together close the forward and upper edges of the connector compartment 33. The cover 59 is also provided with a transversely elongated opening 66 rearwardly of the rib 58 and through which the upwardly extending portion 53 and terminal end 54 of the contact 28 extend.

Guide structure is provided for establishing a positive predetermined position of the splice box 11 relative to the track component 10 upon interconnection therewith and such guide structure takes the form of an extension 67 projecting forwardly from the vertical wall 64 in spaced-apart overlying relation with the cover 59. The extension 67 is provided along each side thereof with depending walls 68a and 68b which gives the guide structure an inverted, generally U-shaped configuration. The guide structure is slidably receivable in the wireway 19 of the track component 10, as shown best in FIG. 4, with the depending walls 68 being dimensioned so as to substantially abut the facing inner surfaces of the walls 16 of the track component and so as to seat within the spaces defined between the flanges 18 and immediately the underlying surfaces of the web 17. The extension 67 has a transversely elongated opening 69 formed therein which is used in structurally interconnecting a pair of splice boxes, and it is further provided with a threaded opening 70 also used in this same reference.

More particularly, when a pair of splice boxes 11 and 12 are used to interconnect successive track components 10 and 13, as shown in FIGS. 1 and 4 through 6, the splice boxes are reversely oriented relative to each other so that the rear sections 31 thereof abut. The splice boxes are constrained in such contiguous relation by a connector strap 71 that bridges the two connector sections 31 and 31' and is provided with downwardly offset fastener plates 72 and 73 which seat upon the extensions 67 and 67' of the splice boxes 11 and 12. The fastener plates 72 and 73 are respectively provided with downwardly struck lugs 74 and 75 dimensioned to seat, respectively, within the openings 69 and 69' of the extensions 67 and 67', as shown in FIG. 4. The fastener 71 is secured in such position by capscrews that extend through openings 76 and 77 respectively provided therefor by the fastener plates 72 and 73 and are threadedly received within the openings 70 and 70' provided by the extensions 67 and 67' of the splice boxes. Thus, the connector strap 71 fixedly interconnects the splice boxes 11 and 12.

As explained hereinbefore, a splice box may be used at an end of a track component for the purpose of connecting the same to a junction box or connector block as shown in FIG. 7; and as respects the present invention, the end box 15 shown is adapted to be secured by capscrews or other suitable fasteners 78 to the splice box 14 and has an opening 79 in a wall thereof through which lead wires (denoted in the aggregate with the numeral 80) extend that are respectively connected with the various contacts of the splice box. The end box 15 is also provided with openings in other walls thereof through which supply lines (not shown) enter the compartment 81 for respective connection with the lead wires 80, and a cover plate may be secured to the box 15 to enclose the compartment 81 thereof.

It is evident from the foregoing that the splice boxes are connectable with a track component at an end thereof without the requirement for special structural provision thereat so that the track component can be cut to any necessary or desirable length to accommodate the requirements of a particular installation. Accordingly, it is only necessary to cut the track component to the length desired insert the contact section 30 of a splice box into the track component, and then rotate the selector structure comprising the cam 48 through an angular distance of 90°, selectively, in one direction to establish a two-conductor single electric circuit or in the opposite direction to establish a three-conductor dual electric circuit. In joining two successive components, a pair of splice boxes are employed, and they are oppositely oriented as described, and may be interconnected by a strap 81 to unite the same mechanically.

The housing 29, cover 59, and connector strap 71 may be formed of an insulating material and may be fabricated of various materials having the characteristic such as one of the plastic materials, a polycarbonate for example. The track component, except for the conductor assembly thereof, may be metal, extruded aluminum for example.

While in the foregoing specification an embodiment of the invention has been set forth in considerable detail for purposes of making a completed disclosure thereof, it will be apparent to those skilled in the art that numerous changes may be made in such details without departing from the spirit and principles of the invention.

We claim:

1. A splice box or the like for use in a power distribution system having a track component provided with a longitudinally extending chamber therealong equipped with a conductor assembly that includes a plurality of conductors insulating one from the others, comprising a casing having a section thereof insertable into such chamber, a pair of contacts mounted within said casing and movable with respect thereto between inner retracted positions and outer extended positions for respective engagement with such conductors following insertion of said casing section into such chamber, selector structure adjustably carried by said casing for movement with respect thereto and being engageable with said contacts to displace the same selectively from their retracted positions into their extended positions, guide structure carried by said casing and cooperative with such track component to positively determine the position of said casing with respect thereto upon insertion of said casing section thereinto and thereby enable interconnection of said contacts with the respective conductors of such track component by appropriate movement of said selector structure, and an additional contact mounted within said casing and being movable with respect thereto between an inner retracted position and an outer extended position for engagement with one such conductor following insertion of said casing section into the chamber of such track component, said selector structure being movable in one direction to effect displacement of said additional contact into the outer extended position thereof concurrently with corresponding displacements of the aforesaid pair of contacts into their outer extended positions and being movable in an opposite direction to displace the aforesaid pair of contacts outwardly into their extended positions without so displacing said additional contact into its outer extended position, said casing being provided with an end portion larger in at least one transverse dimension than said casing section and being abuttable with an end of such track component to limit the extent of insertion of said casing section into the chamber thereof, said guide structure extending along said casing section in spaced-apart overlying relation therewith for slidable insertion into such track component.

2. The splice box of claim 1 in which each of said contacts is an elongated component having an end portion thereof extending longitudinally in substantially unsupported relation, and in which said selector structure is engageable with the end portion of each contact to displace the same laterally into its outer extended position and thereby effect engagement thereof with a conductor of such track component.

3. The splice box of claim 2 in which said selector structure has an offset portion engageable with said additional contact to displace the same laterally into its outer extended position when said selector structure is moved in one direction and ineffective to displace it into such outer extended position when said selector structure is moved in the opposite direction.

4. A splice box or the like for use in a power distribution system having a track component provided with a longitudinally extending chamber therealong equipped with a conductor assembly that includes a plurality of conductors insulating one from the others, comprising a casing having a section thereof insertable into such chamber, a pair of contacts mounted within said casing and movable with respect thereto between inner retracted positions and outer extended positions for respective engagement with such conductors following insertion of said casing section into such chamber, selector structure adjustably carried by said casing for movement with respect thereto and being engageable with said contacts to displace the same selectively from their retracted positions into their extended positions, and guide structure carried by said casing and cooperative with such track component to positively determine the position of said casing with respect thereto upon insertion of said casing section thereinto and thereby enable interconnection of said contacts with the respective conductors of such track component by appropriate movement of said selector structure, said guide structure extending along said casing section in spaced-apart overlying relation therewith for slidable insertion into such track component.

5. The splice box of claim 4 and further comprising an additional contact mounted within said casing and being movable with respect thereto between an inner retracted position and an outer extended position for engagement with one such conductor following insertion of said casing section into the chamber of such track component, and in which said selector structure is movable in one direction to effect displacement of said additional contact into the outer extended position thereof concurrently with corresponding displacements of the aforesaid pair of contacts into their outer extended positions and is movable in an opposite direction to displace the aforesaid pair of contacts outwardly into their extended positions without so displacing said additional contact into its outer extended position.

6. A splice box or the like for use in a power distribution system having a track component provided with a longitudinally extending chamber therealong equipped with a conductor assembly that includes a plurality of conductors insulating one from the others, comprising a casing having a section thereof insertable into such chamber, a pair of contacts mounted within said casing and movable with respect thereto between inner retracted positions and outer extended positions for respective engagement with such conductors following insertion of said casing section into such chamber, selector structure adjustably carried by said casing for movement with respect thereto and being engageable with said contacts to displace the same selectively from their retracted positions into their extended positions, guide structure carried by said casing and cooperative with such track component to positively determine the position of said casing with respect thereto upon insertion of said casing section thereinto and thereby enable interconnection of said contacts with the respective conductors of such track component by appropriate movement of said selector structure, said casing having an end portion from which said section thereof extends and a connector strap for securing two such splice boxes in longitudinal disposition with said end portions thereof in substantial abutment and said casing sections projecting therefrom in opposite longitudinal directions, said casing being equipped with means for securing said connector strap thereto.

7. The splice box of claim 6 in which said casing is equipped with a removable cover, and in which said securing means are provided thereby.

8. The splice box of claim 7 in which said casing and removable cover are provided with insulating barriers separating said contacts thereat to insulate the same from each other.

9. A splice box or the like for use in a power distribution system having a track component provided with a longitudinally extending chamber therealong equipped with a conductor assembly that includes a plurality of conductors insulating one from the others, comprising a casing having a section thereof insertable into such chamber, at least three contacts mounted within said casing and being movable with respect thereto between inner retracted positions and outer extended positions for respective engagement with such conductors following insertion of said casing section into such chamber, three-position selector structure pivotally carried by said casing for selective displacements with respect thereto in opposite angular directions from an intermediate neutral position into one or another of two active positions, said selector structure upon displacement thereof in one angular direction into one active position being engageable with a plurality of said contacts to move the same into their outer extended positions thereof and also upon displacement thereof in the opposite angular direction into another active position being engageable with a plurality of said contacts to move the same into their outer extended positions, and give structure provided by said splice box for positively determining the position of said casing with respect that such track component upon insertion of said casing section thereinto and thereby enabling interconnection of said contacts with the respective conductors of such track component by appropriate movement of said selector structure in one or the other of such opposite angular directions.

10. The splice box of claim 9 in which each of said contacts is an elongated spring component having an end portion thereof extending longitudinally in substantially unsupported relation and biased toward the inner retracted position thereof, and in which said selector structure is abuttably engageable with the end portion of each contact to displace the same laterally into its outer extended position and thereby effect engagement thereof with a conductor of such track component.

11. The splice box of claim 9 in which said selector structure has cam surfaces engageable with a certain two of said contacts to move the same into their outer extended positions upon displacement of said selector structure in either of said opposite angular directions into one or the other of said active positions and is equipped with a cam portion engageable with the third of said contacts only when displaced in one of said opposite angular directions into the active position associated therewith to move said third contact into its outer extended position concurrently with movement of the aforesaid two contacts.